United States Patent
Liu et al.

(10) Patent No.: US 9,015,267 B2
(45) Date of Patent: Apr. 21, 2015

(54) METHOD FOR SETTING ADDRESSES OF SLAVE DEVICES IN COMMUNICATION NETWORK

(71) Applicant: Motech Industries, Inc., New Taipei (TW)

(72) Inventors: Yung-Hsiang Liu, Taipei (TW); Kuo-Hsin Chu, Hsinchu (TW); Wen-Cheng Liang, Chiayi (TW)

(73) Assignee: Motech Industries, Inc., New Taiper (TW)

( * ) Notice: Subject to any disclaimer, the term of this patent is extended or adjusted under 35 U.S.C. 154(b) by 230 days.

(21) Appl. No.: 13/838,705

(22) Filed: Mar. 15, 2013

(65) Prior Publication Data

US 2014/0173013 A1    Jun. 19, 2014

(30) Foreign Application Priority Data

Dec. 19, 2012   (TW) .............................. 101148462 A

(51) Int. Cl.
*H04L 12/40*    (2006.01)
*H04L 12/403*   (2006.01)
*H04L 29/12*    (2006.01)

(52) U.S. Cl.
CPC ..... *H04L 12/403* (2013.01); *H04L 2012/40228* (2013.01); *H04L 61/00* (2013.01)

(58) Field of Classification Search
USPC .................................................. 709/211, 208
See application file for complete search history.

(56) References Cited

U.S. PATENT DOCUMENTS

| | | | |
|---|---|---|---|
| 2006/0123168 A1* | 6/2006 | Lang | 710/110 |
| 2010/0257295 A1* | 10/2010 | Nielsen | 710/110 |
| 2010/0325325 A1* | 12/2010 | Fernald et al. | 710/106 |
| 2011/0040847 A1* | 2/2011 | Sato et al. | 709/208 |

* cited by examiner

*Primary Examiner* — Jude Jean Gilles
(74) *Attorney, Agent, or Firm* — The Farrell Law Firm, P.C.

(57) ABSTRACT

A method for setting addresses of slave devices in a communication network is provided. In the communication network, a master device identifies address-collided slave devices and requests the address-collided slave devices to return their unique identification data. The master device sets addresses of the address-collided slave devices so that each of the slave devices in the communication network has a different address from one another.

15 Claims, 9 Drawing Sheets

METHOD FOR SETTING ADDRESSES OF SLAVE DEVICES IN COMMUNICATION NETWORK

PRIORITY

This application claims priority to Taiwan application Serial No. 101148462, filed Dec. 19, 2012, the subject matter of which is incorporated herein by reference.

BACKGROUND OF THE APPLICATION

1. Field of the Application

The application relates to a method for setting addresses of slave devices in a communication network.

2. Description of the Related Art

A communication system, e.g., a communication system compliant to Modbus specifications, includes a master device and one or multiple slave devices. In the Modbus communication system, in each communication, the master device initiatively sends a message and then a target slave device responses. More specifically, only one communication can be performed at a time. In the event of two or multiple slave devices having the same address, these slave devices simultaneously return data to the master device to lead to erroneous returned data and thus a communication failure. Such occurrence is referred as a communication collision.

For communication, the master device sets addresses of the slave devices, generally by manual or automatic means. In manual setting, operating staff manually sets an address for each of the slave devices. However, in communication collision, the operating staff first connects one of the slave devices involved in the communication collision to the master device and modifies the address of the connected slave device. Thus, the operating staff may spend a substantial amount of time to solve the communication collision if the communication collision involves a large number of slave devices.

The communication collision may also be solved by automatic means. Yet, it remains a target of industrialists to provide a solution for further reducing a search time for finding the slave devices involved in the communication collision.

SUMMARY OF THE APPLICATION

According to an embodiment of the disclosure, a method for setting addresses of slave devices in a communication network is provided. In the method, a master device identifies slave devices having a same address (i.e. address-collided slave devices), and requests the address-collided slave devices to return their unique identification data to the master device. The master device then sets the addresses of the address-collided slave devices, so that each of the slave devices in the communication network has a different address from one another.

According to another embodiment of the disclosure, a method for setting addresses of slave devices in a communication network is provided. A master device requests for unique identification data of all the slave devices. All the slave devices return their unique identification data to the master device according to a predetermined period designated by the master device. For the slave devices that correctly responded, the master device sets the addresses of these slave devices. For the slave devices which respond collided (i.e., the slave devices that returned their unique identification data at the same time), the master device repeats the above steps until the response time of all the slave devices are collision-free.

According to an exemplary embodiment of the disclosure, a method for setting address of slave devices in a communication network is provided. The communication network includes a master device and multiple slave devices. The master device communicates with each of the slave devices according to an address of each of the slave devices. The method includes steps of: a) in response to a request from the master device, each of the slave devices responding to the master device according to its address; b) identifying a collision address group and an unused address group, wherein the collision address group includes a same address stored in at least two of the slave devices, and the unused address group includes multiple addresses that are not stored in any of the slave addresses; c) selecting a first address from the collision address group; d) r randomly returning a first unique identification data from the first slave device storing the first address to the master device within a predetermined period; e) the master device communicating with the first slave device to set a first unused address from the unused address group to the first slave device according to the first unique identification data; and f) repeating the steps (d) and (e) until the collision address group excludes the first address.

According to yet another exemplary embodiment of the disclosure, a method for setting addresses of slave devices in a communication network is provided. The communication network includes a master device and multiple slave devices. The master device communicates with each of the slave devices according to an address stored in each of the slave devices. The method includes steps of: a) setting a predetermined period and an unused address group, wherein the unused address group includes an address that is not stored in any of the slave devices; b) sending a broadcast detection instruction to request each of the slave devices to return its unique identification data within the predetermined period; c) the master device obtaining a signal collision number and a first unique identification data group according to a response of each of the slave devices, wherein the first unique identification data group includes respective unique identification data returned from the slave devices that are correctly identified by the master device; d) selecting a first unique identification data from the first unique identification data group, communicating with a first slave device among the slave devices to set a first unused address from the unused address group as a new address of the first slave device according to the first unique identification data, disabling the first device for not responding to the broadcast detection instruction, and removing the first unique identification data from the first unique identification data group; e) repeating step (d) until the first identification data group does not include any unique identification data; f) resetting the predetermined period according to the signal collision number; and repeating the steps (b), (c), (d) and (e) until none of the slave devices responds to the broadcast detection instruction sent by the master device after the predetermined period ends.

The above and other contents of the application will become better understood with regard to the following detailed description of the preferred but non-limiting embodiments. The following description is made with reference to the accompanying drawings.

DETAILED DESCRIPTION OF THE APPLICATION

A method for setting addresses of slave devices in a communication network is disclosed in the embodiments below for preventing and solving a communication collision of the slave devices.

In one embodiment, a master device identifies address-collided slave devices, i.e., slave devices having the same address. By utilizing an anti-collision instruction provided in the embodiment, the master device requests the slave devices to return their unique identification information. Further, by utilizing an address setting instruction provided in the embodiment, the master device sets the addresses of the address-collided slave devices, so that each of the slave devices in the communication network has a different address from one another.

In an alternative embodiment, the master device requests for the respective unique identification data of all the slave devices. The slave devices return their unique identification data within a predetermined period designated by the master device. For the slave devices that correctly responded (i.e., response time of the slave devices does not-collide), the master device sets the addresses of these non-collided slave devices. For the slave devices whose response time collides (i.e., the slave devices returns their unique identification data at the same time point), the master device repeats the above steps until the response time of all the slave devices does not collide.

Details of the above two embodiments shall be described below.

Figure 1:
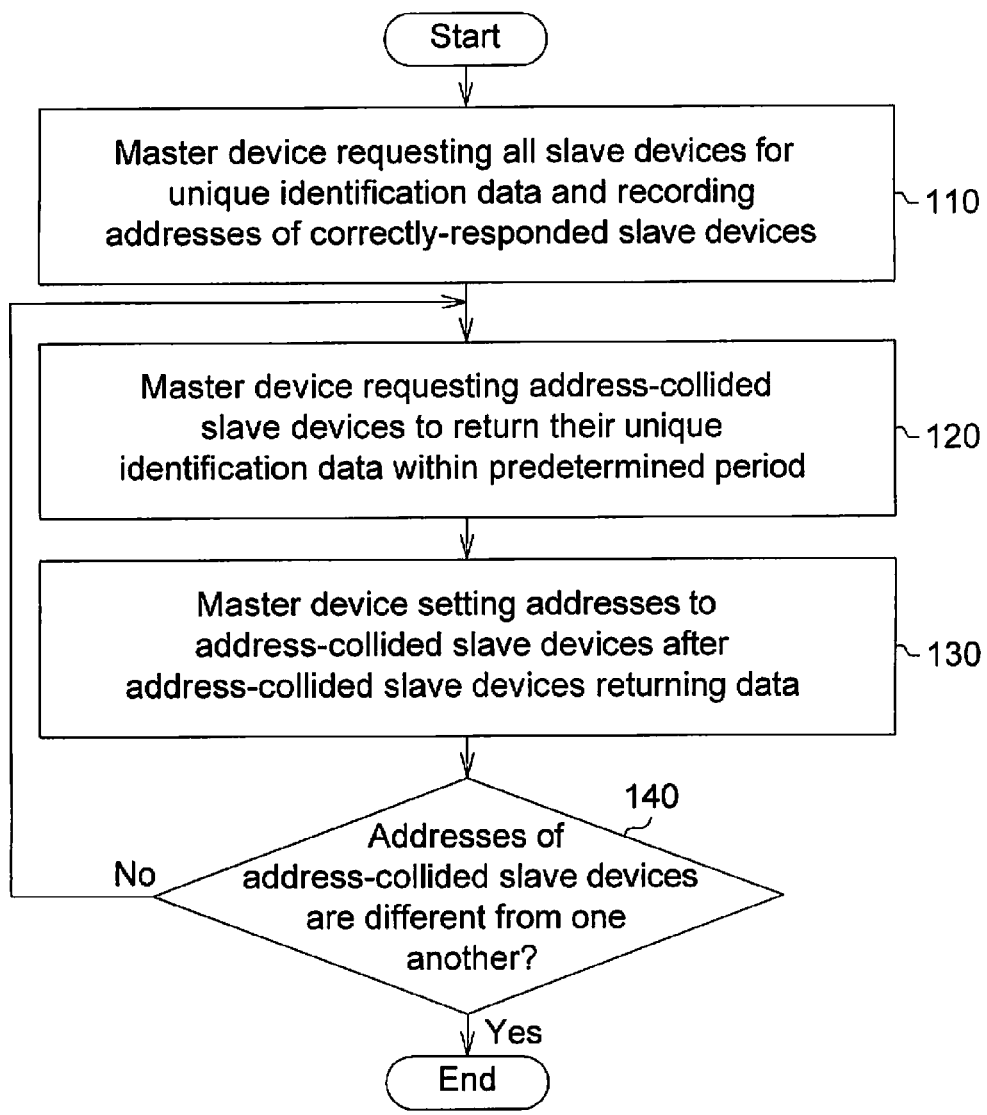
FIG. 1 is a flowchart of a method for setting addresses of slave devices in a communication network according to an embodiment of the present application.

FIG. 1 shows a flowchart of a method for setting addresses of slave devices in a communication network according to one embodiment. FIGS. 2A to 2H are schematic diagrams of setting the addresses of the slave devices in the communication network in FIG. 1.

Referring to FIG. 1, in step 110, a master device requests for unique identification data of all the slave devices, and records the addresses of the slave devices that correctly responded. More specifically, for example, based on a communication protocol, the master device sends out request instructions each respectively having one of addresses 1 to 255, maybe in incremental order. In the embodiment, the address range 1 to address 255 is taken as an example rather than a limitation to the present application.

For more detailed illustrations, a request instruction from the master device, which is compliant to the Modbus communication protocol, is exemplified below.

| Start Byte | Slave Address | Function | Starting Address HiByte | Starting Address LoByte |
|---|---|---|---|---|
| 0AH | X | 03 | 00~03H | 1~FFH |

| No. of Data HiByte | No. of Data LoByte | CS (CRC) LoByte | CS (CRC) HiByte | Stop Byte |
|---|---|---|---|---|
| 0 | n | — | — | 0DH |

To request for the unique identification data of the slave devices, the column "function" of the request instruction is set to "03". If received a request instruction having the column "Slave Address" as "1", the slave device with an address "1" responds, whereas other slave devices disregard the request instruction.

Figure 2A:
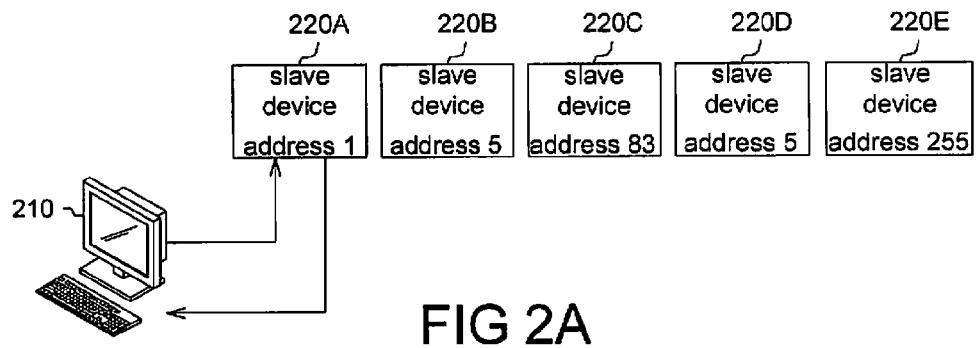
FIGS. 2A to 2H are schematic diagrams of setting the addresses of the slave devices in the communication network in FIG. 1.
Figure 2B:
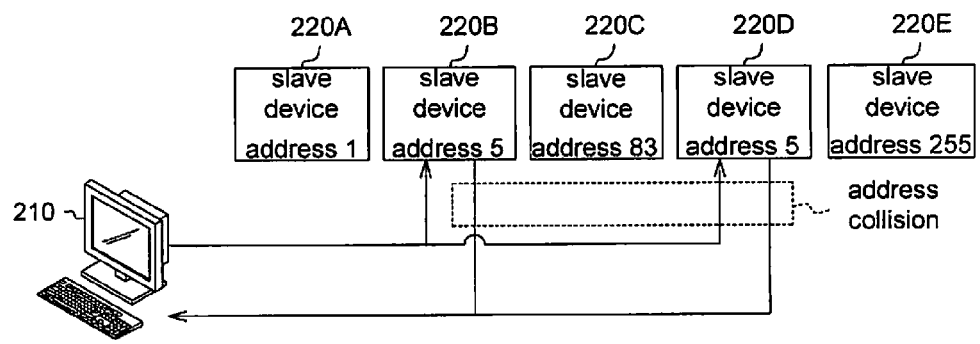

As shown in FIG. 2A, if a master device 210 sends a request instruction with the column "Slave Address" of "1" to all slave devices 220A to 220E, the slave device (if any) having a address of "1" returns its unique identification data to the master device 210. For example, the unique identification data is a combination of a model number and a serial number of the slave device. In an alternative embodiment, the unique identification data may be a serial number and a checksum (cyclic redundancy check, CRC). In yet another embodiment, data sufficient for the master device to identify the slave device may also serve as the unique identification data.

For more detailed illustrations, an instruction format of a response from the slave device, which is compliant to the Modbus communication protocol, is exemplified below.

| Start Byte | Slave Address | Function | Byte Count | Data 1 HiByte | Data1 LoByte |
|---|---|---|---|---|---|
| 0AH | X | 03 | 2 * n | * | * |

| Data n HiByte | Data n LoByte | CS (CRC) LoByte | CS (CRC) HiByte | Stop Byte |
|---|---|---|---|---|
| * | * | — | — | 0DH |

In the response, the slave device fills its unique identification data to the columns "Data 1 HiByte" to "Data n LoByte".

The master device 210 sequentially sends out request instructions having the column "Slave Address" in values of 2 to 255. Similarly, in FIG. 2B, when the master device 210 sends out the request instruction with the column "Slave Address" of "5", the slave devices 220B and 220D respond to the request instruction. As the master device 210 receives two or more sets of returned data at once, the master device 210 determines that an address collision takes place, i.e., at least two slave devices have the same addresses.

Figure 2C:
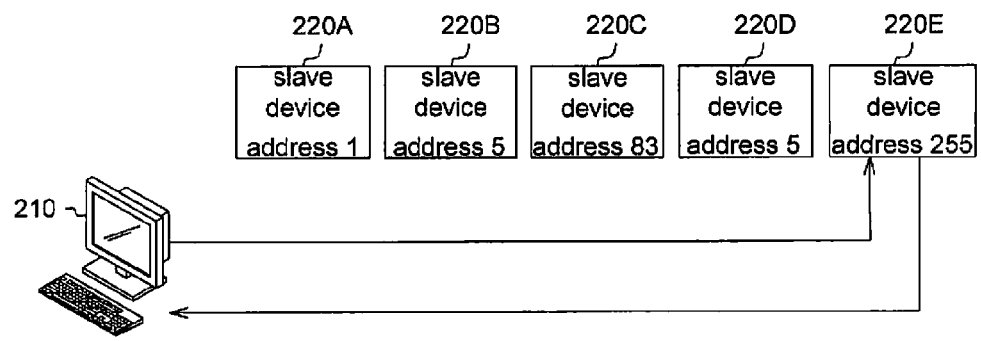

In FIG. 2C, similarly, when the master device 210 sends out the request instruction with the column "Slave Address" of "255", the slave device 220E responds to the request instruction. Although a response from the slave device 220C is not depicted in FIG. 2C, it is concluded from the above descriptions that the slave device 220C responds to the master device 210 when the master device 210 sends out the request instruction with the column "Slave Address" of "83".

The master device 210 records data and addresses of the slave devices that correctly responded. Taking FIGS. 2A to 2C for example, the master device 210 determines that the slave devices 220A, 220C and 220E having the addresses 1, 83 and 255 correctly responded, and thus the master device 210 records the address 1, 83 and 255 to indicate that the addresses 1, 83 and 255 are correctly set to associated slave devices. Further, the master device 210 also records collided addresses, so as to solve the address collision in subsequent operations.

Figure 2D:
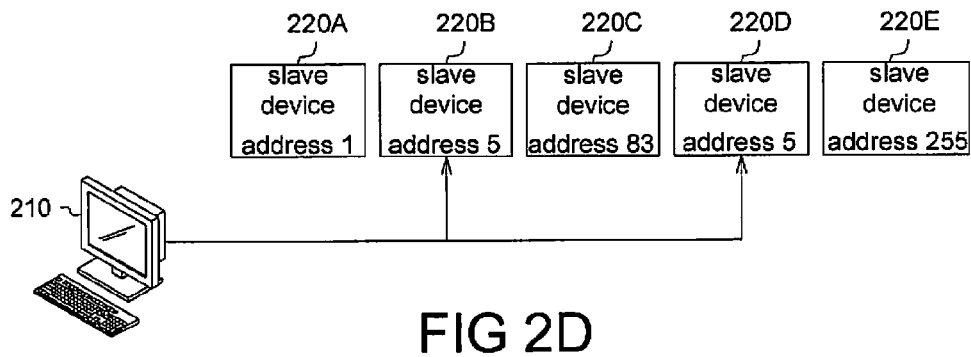

In step 120, the master device 210 sends out an anti-collision instruction to prompt the address-collided slave devices to randomly return their unique identification data within a predetermined period. More specifically, as shown in FIG. 2D, the master device 210 sends an anti-collision instruction to the slave devices address-collided 220B and 220D. In the anti-collision instruction, the master device 210 designates a predetermined period, within which the slave devices 220B and 220 may randomly return their unique identification data to the master device 210.

For more detailed illustrations, the anti-collision instruction sent out by the master device 210 and compliant to the Modbus communication protocol exemplified below shall be described. It should be noted that, the anti-collision instruction is a new instruction format proposed by the embodiment of the present application, and is not included in the standardized Modbus communication protocol.

| Start Byte | Slave Address | Function | Register Address HiByte | Register Address LoByte | Preset Data HiByte | Preset Data LoByte | CS (CRC) LoByte | CS (CRC) HiByte | Stop Byte |
|---|---|---|---|---|---|---|---|---|---|
| 0AH | XX | 09 | 0 | 0 | 0 | 1 | — | — | 0DH |

The value "09" in the column "Function" represents this instruction is an anti-collision instruction.

Figure 2E:
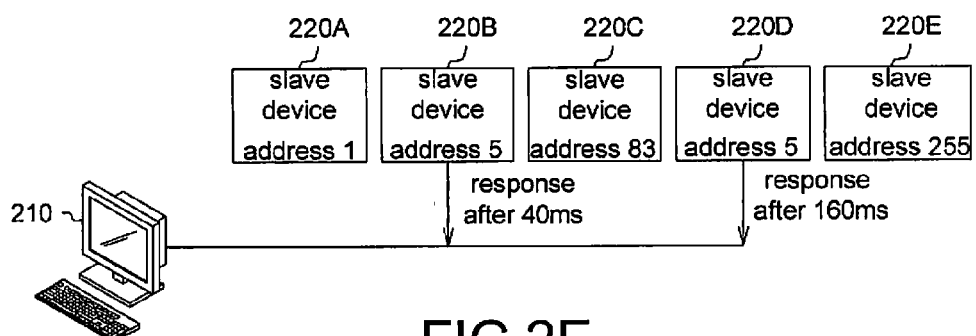

As shown in FIG. 2E, within the predetermined period (e.g., (0~9)*20 ms), the slave device 220B responds randomly after the slave device received the anti-collision instruction, for example at 40 ms after receiving the anti-collision instruction, and the slave device 220E responds randomly at 160 ms after receiving the anti-collision instruction.

In the embodiment, reasons for defining the time step of the predetermined period as 20 ms are as below. Assume that the Baud rate is 9600, meaning that 9600 bits can be transmitted per second. In response to the anti-collision instruction, 13 sets of data in total are returned from the slave devices. Each set of data has 10 bits, i.e. a starting bit (1 bit), an ending bit (1 bit) and data bits (8 bits), and so a period of 13*10/9600=13.5 ms is required for the master device to receive complete data. Thus, in the embodiment, the time step of the predetermined period is 20 ms to prevent data overlap.

In step 130, if the address-collided slave devices correctly return data (i.e., the address-collided slave devices return data at different time points), the master device designates addresses to the address-collided slave devices. Conversely, if the address-collided slave devices return their unique identification data at exactly the same time point again, according to the original predetermined period or a new period designated by the master device, the master device requests the address-collided slave devices to randomly return their unique identification data within the original predetermined period or the newly designated period.

More specifically, after obtaining the unique identification data of the address-collided slave devices, the master device sends an address setting instruction for setting the addresses of the address-collided slave devices. According to the obtained unique identification data, the master device determines how to set the addresses to the address-collided slave devices, in a way that the addresses of these address-collided slave devices are different from one another and are different from those of other slave devices whose addresses have been correctly set. Further, according to the number of the unique identification data obtained, the master device identifies to set addresses of how many slave devices in the current round. Taking FIG. 2A for example, the master device identifies to set addresses of two slave devices in the current round. The master device further designates unused addresses to the address-collided slave devices, and records the designated addresses.

For more detailed illustrations, the address setting instruction sent out by the master device 210 and compliant to the Modbus communication protocol exemplified below shall be described. It should be noted that, the address setting instruction is a new instruction format proposed by the embodiment of the present application, and is not included in the standardized Modbus communication protocol.

| Start Byte | Slave Address | Function | MODEL HiByte | MODEL LoByte | SN_ HIGH HiByte | Stop Byte |
|---|---|---|---|---|---|---|
| 0AH | XX | 08 | 1 | 0CCH | 2 | 0DH |

| SN_ HIGH LoByte | SN_ LOW HiByte | SN_ LOW LoByte | New Address | CS (CRC) LoByte | CS (CRC) HiByte |
|---|---|---|---|---|---|
| 62H | 0 | 1 | 1~FFH | — | — |

The value "08" in the column "Function" represents this instruction is an address setting instruction. The new address designated by the master device is filled in the column "New Address".

In response to the address setting instruction from the master device 210, the slave device returns an instruction to the master device 210 to acknowledge that the address of the slave device is modified.

For more detailed illustrations, the instruction returned by the slave device in response to the address setting instruction and compliant to the Modbus communication protocol exemplified below shall be described.

| Start Byte | Slave Address | Function | MODEL HiByte | MODEL LoByte | SN_ HIGH HiByte |
|---|---|---|---|---|---|
| 0AH | XX | 08 | 1 | 0CCH | 2 |

| SN_ HIGH LoByte | SN_ LOW HiByte | SN_ LOW LoByte | New Address | CS (CRC) LoByte | CS (CRC) HiByte | Stop Byte |
|---|---|---|---|---|---|---|
| 62H | 0 | 1 | 1~FFH | — | — | 0DH |

Figure 2F:
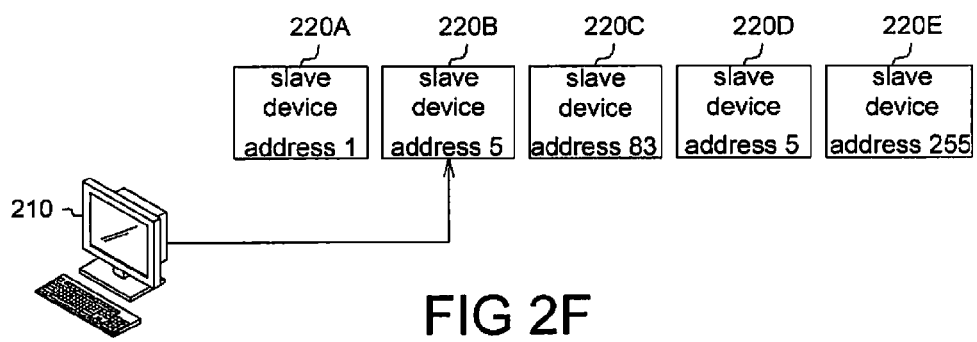
Figure 2G:
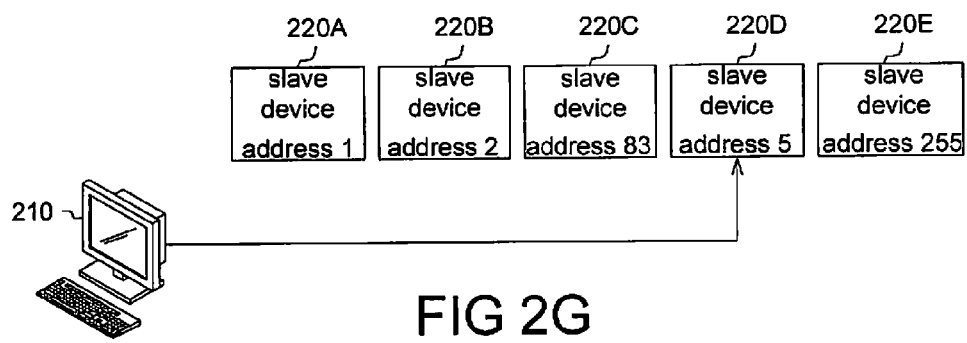
Figure 2H:
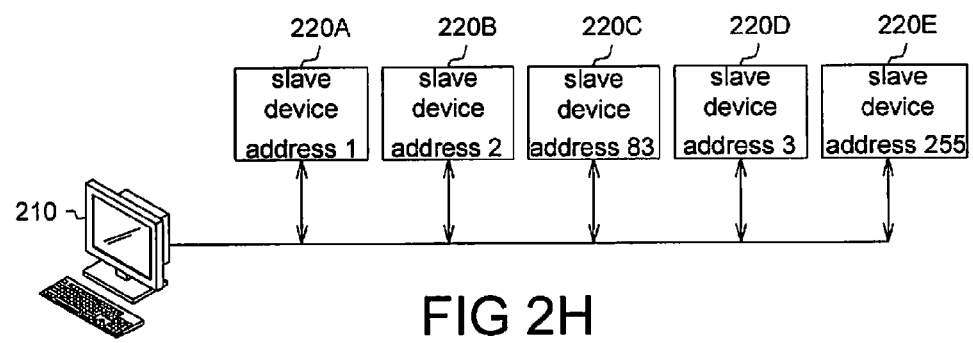

As shown in FIGS. 2F to 2H, the master device respectively designates the address 2 and the address 3 to the slave devices 220B and 220D, so as to change the addresses of the slave devices 220B and 220D to 2 and 3, respectively.

In the embodiment, for the address-collided slave devices, the master device changes the addresses of all the address-collided slave devices, as shown in FIGS. 2F to 2H, for example. In an alternative embodiment, for the address-collided slave devices, the master device may keep the address of one of the address-collided slave addresses unchanged while changing the addresses of all other address-collided slave devices. For example, in an alternative embodiment, the master device may keep the address of either the slave device 220B or 220D unchanged, and change the address of the other slave device 220B or 220D. Regardless of the approach adopted, in principle, after address setting, the master device sets the addresses of the address-collided slave devices to be different from one another as well as from the (previously set) addresses of the other address-set slave devices.

In step 140, it is determined whether all the address-collided slave devices have been processed. That is, it is determined whether the addresses of the address-collided slave devices are different from one another. If so, the address setting process ends. If not, the process iterates step 120 to perform steps 120 and 130 on a next group of address-collided slave devices. After successfully executing the process in FIG. 1, it means that the master device 210 completes address searching and address setting, and so the master device 210 may start monitoring the slave devices.

It is known from the above descriptions that, in the embodiment, the anti-collision instruction sent out by the master device 210 includes the designated addresses, and only the address-collided slave devices matching the addresses return data. Therefore, a collision probability of the communication-collided slave devices returning data at the same time point is reduced.

The process in FIG. 1 is performed when the communication network is installed for the first time to prevent the slave devices from the address collision (communication collision). When a new slave device is later added to the communication network, the master device performs steps 110 to 140 in FIG. 4 to ensure that the newly added slave device is kept free from an address collision.

In summary, in the method for setting addresses of slave devices in a communication network according to the embodiment, the communication network includes a master device and multiple slave devices. The master device is capable of communicating with each of the slave devices according to an address of each of the slave devices.

The above method includes: a) in response to a request of the master device, each of the slave devices responding to the master device according to an address of each of the slave devices.

The above method further includes: b) identifying a collision address group and an unused address group. The collision address group includes a same address stored in at least two of the slave devices, and the unused address group includes multiple addresses that are not stored in any of the slave devices. In step (b), for example, the collision address group includes the address 5 (stored in the slave devices 220B and 220D) in FIG. 2B, and the unused address group includes the addresses that are not yet designated to the slave devices from the addresses 1 to 255. For example, in a stage depicted by FIG. 2H during the process, the unused address group includes the addresses 4 to 82 and 84 to 254, as the addresses 1 to 3, 83 and 255 are already designated to the slave devices 220A to 220E.

The above method further includes: c) selecting a first address from the collision address group. Taking FIG. 2D for example, the first address in the collision address group is the address 5.

The above method further includes: d) rendering a first slave device storing the first address to randomly return first unique identification data of the first slave device to the master device within a predetermined period. Taking FIG. 2E for example, the slave device 220B randomly returns its unique identification data to the master device 210 within the predetermined period.

The above method further includes: e) according to the first unique identification data, the master device communicates with the first slave device to set a first unused address from the unused address group to the first slave device. Taking FIG. 2G for example, the master device 210 communicates with the slave device 220B to set an unused address (the address 2) from the unused address group to the slave device 220B.

The above method further includes: f) repeating steps (d) and (e) until the collision address group exclude the first address. That is to say, the above steps are repeated until the address 5 no longer belongs to the collision address group. Taking FIGS. 2A to 2H for example, after performing the process, the communication-collided slave devices 220B and 220D (originally storing the address 5) are respectively designated with new addresses (respectively designated with the address 2 and the address 3). As such, the address 5 no longer belongs to the collision address group.

The above method further includes: repeating steps (d), (e) and (f) until the collision address group does not include any address. That is to say, the above steps are repeated, so that the addresses of all the address-collided slave devices are different from one another—the collision address group no longer includes an address.

In the above method, a range of the addresses of the slave devices is natural numbers of 1 to N. For example, in FIGS. 2A to 2H, N equals 255. In a sequence of the addresses, the slave devices respond to the master device. In the above description, the master device sends out the request instructions having addresses 1 to 255 to all the slave devices to request for responses.

In the above method, step (e) further includes: e-1) removing the first unused address from the unused address group. For example, as shown in FIGS. 2G and 2H, since the address 2 and the address 3 are respectively designated to the slave devices 220B and 220D, the address 2 and the address 3 no longer belong to the unused address group. Therefore, the address 2 and the address 3 are removed from the unused address group.

In the above method, step (f) further includes: f-1) rendering the first address to be stored only by the first slave device. For example, when setting addresses to the address-collided slave devices, the address of the slave device 220B may be kept unchanged, whereas the address/addresses of the other address-collided slave device(s) is/are changed.

In the above method, step (f) further includes: f-2) rendering the first address to be not stored by any of the address-collided slave devices. For example, when setting the addresses of the address-collided slave devices, the addresses of the address-collided slave devices 220B and 220D are both changed.

Figure 3:
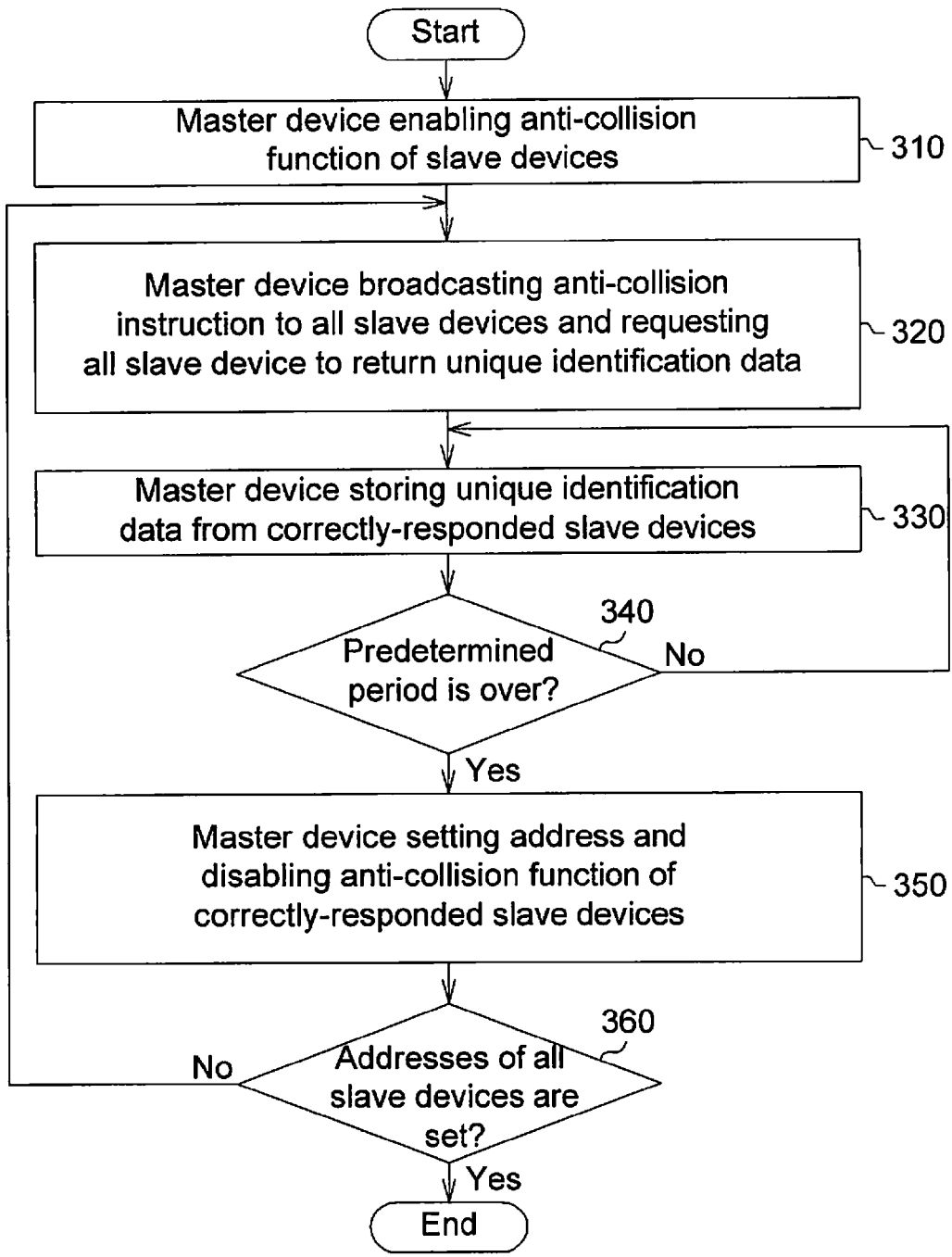
FIG. 3 is a flowchart of a method for setting addresses of slave devices in a communication network according to another embodiment of the present application.

FIG. 3 shows a flowchart of a method for setting addresses of slave devices in a communication network according to another embodiment. FIGS. 4A to 4J are schematic diagrams of setting the addresses of the slave devices in the communication network in FIG. 3.

As shown in FIG. 3, in step 310, a master device enables an anti-collision function of all slave devices in the communication network. More specifically, the master device may send out an anti-collision enable instruction to enable the anti-collision function of all the slave devices. The anti-collision instruction sent out by the master device 210 and compliant to the Modbus communication protocol exemplified below shall be described. It should be noted that, the anti-collision instruction is a new instruction format proposed by the embodiment of the present application, and is not included in the standardized Modbus communication protocol.

9600, the time step may be 20 ms (the predetermined period may be set to (0~n−1)*20 ms); for a Baud rate of 19200, the time step may be 10 ms (the predetermined period may be set to (0~n−1)*10 ms); for a Baud rate of 38400, the time step may be 5 ms (the predetermined period may be set to (0~n−1)*5 ms).

| Start Byte | Slave Address | Function | Register Address HiByte | Register Address LoByte | Preset Data HiByte | Preset Data LoByte | CS (CRC) LoByte | CS (CRC) HiByte | Stop Byte |
|---|---|---|---|---|---|---|---|---|---|
| 0AH | 00H | 0BH | 0 | xxH | 0 | YY | — | — | 0DH |

The value "0BH" in the column "Function" represents this instruction is an anti-collision instruction. When the column "Preset Data LoByte" is "1" (YY=1), it means the anti-collision function is enabled. Conversely, when the column "Preset Data LoByte" is "0" (YY=0), it means the anti-collision function is not enabled.

Figure 4A:
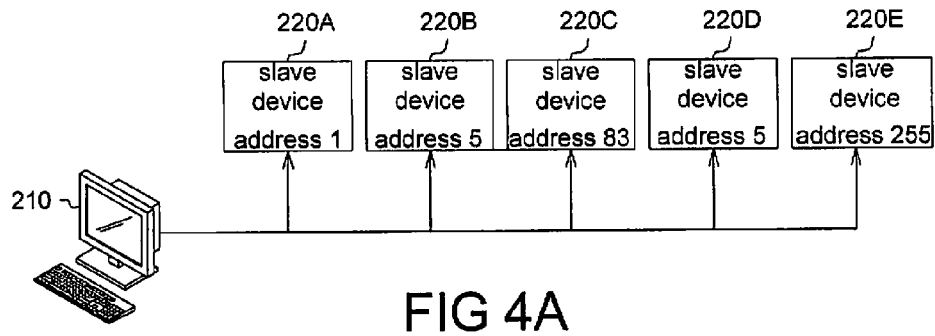
FIGS. 4A to 4J are schematic diagrams of setting the addresses of the slave devices in the communication network in FIG. 3.
Figure 4B:
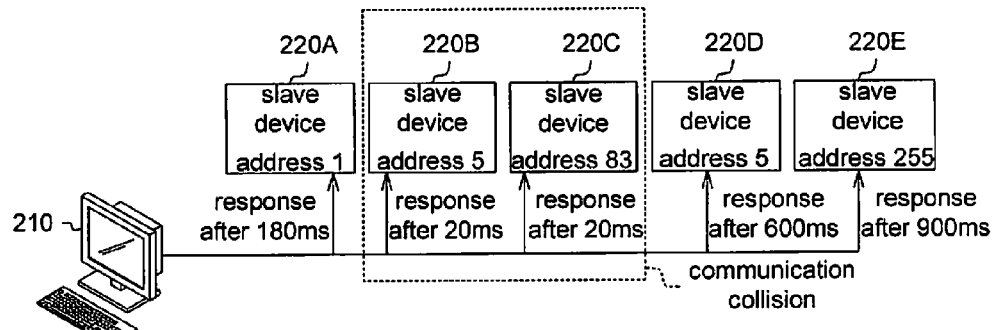

In step 320, the master device broadcasts the anti-collision instruction to all the slave devices to request all the slave devices to randomly return their unique identification data within a predetermined period. As shown in FIG. 4B, all the slave devices return their unique identification data. However, since the slave devices 220B and 220C respond at the same time point, the master device is incapable of identifying. In the embodiment, the slave devices that return their unique identification data at the same time point are regarded as communication collision, regardless of whether the addresses of the communication-collided slave addresses are the same.

Similarly, in the embodiment, the unique identification data is a combination of a serial number and a checksum, or a combination of a model number and a serial number of the slave device.

The master device sends out the anti-collision instruction (a new instruction format proposed by the embodiment of the present application, and is not included in the standardized Modbus communication protocol) as a communication instruction to all the slave devices at the same time. The slave devices randomly return their unique identification data within the predetermined period. As shown in FIG. 4A, the master device 210 sends an anti-collision instruction to all the slave devices 220A to 220E.

For more detailed illustrations, the anti-collision instruction sent out by the master device 210 and compliant to the Modbus communication protocol exemplified below shall be described. It should be noted that, the anti-collision instruction is a new instruction format proposed by the embodiment of the present application, and is not included in the standardized Modbus communication protocol. Further, the anti-collision instruction in this embodiment is different from the anti-collision instruction in the previous embodiment.

In step 330, the master device stores the unique identification data of the correctly responded slave devices. Taking FIG. 4B for example, the master device 210 stores the unique identification data of the slave devices 220A, 220D and 220E that correctly responded. Further, in step 330, the master device may also record the number of collisions. Taking FIG. 4B for example, the number of collisions is 1, whereas the number of the collided slave devices is 2.

In step 340, the master device determined whether the predetermined period is over. If not, the master device continues to wait for returned data from the slave devices. If so, the process continues to step 350.

In step 350, the master device sets the addresses of the correctly responded slave devices and disables the anti-collision function of these correctly-responded slave devices. As shown in FIGS. 4C to 4F, the master device 210 sets the addresses of the slave devices 220A, 220D and 220E that correctly responded (e.g., to the addresses 1, 2 and 3), and disables the anti-collision function of the slave devices 220A, 220D and 220E.

In step 350, the master device sends out a following instruction, which is not included in the standardized Modbus communication protocol although being compliant to the standardized Modbus communication protocol.

| Start Byte | Slave Address | Function | SN_EE CRC HiByte | SN_EE CRC LoByte | SN_ HIGH HiByte | SN_ HIGH LoByte |
|---|---|---|---|---|---|---|
| 0AH | XX | 07 | 00 | 00 | 2 | 62H |

| SN_ LOW HiByte | SN_ LOW LoByte | New Address | Enable Disable Command 10 | CS (CRC) LoByte | CS (CRC) HiByte | Stop Byte |
|---|---|---|---|---|---|---|
| 0 | 1 | 1~FFH | 0~1 | — | — | 0DH |

The column "New Address" represents the new address that the master device designates to the slave device. The

| Start Byte | Slave Addres-s | Function | Register Address HiByte | Register Address LoByte | Preset Data HiByte | Preset Data LoByte | CS (CRC) LoByte | CS (CRC) HiByte | Stop Byte |
|---|---|---|---|---|---|---|---|---|---|
| 0AH | 00H | 10 | 0 | 0 | 0 | 1~FFH | — | — | 0DH |

The value "10" in the column "Function" represents this instruction is an anti-collision instruction. The predetermined period designated by the master device is filled in the column "Preset Data LoByte". An initial predetermined period may be set to (0~n−1)*20 ms, where n is a natural number and is preferably greater than the number of the slave devices.

A time step of the predetermined period may be defined according to the Baud rate. For example, for a Baud rate of column "Enable/Disable Command 10" represents whether the anti-collision function is to be enabled, e.g., "0" for disable and "1" for enable.

In step 350, as the addresses of the correctly responded slave devices are already set, the anti-collision function of these correctly responded slave devices can be disabled. Thus, when the master device needs to later perform the anti-collision operation (as step 320), the slave devices with correctly set addresses do not again return data, thereby preventing repetitive setting operations to accelerate address setting.

From a different perspective, when a new slave device is added into the communication network, instead of again setting the addresses of the slave devices with correctly set addresses, the master device may request only the newly added slave device to return the unique identification data by utilizing the anti-collision instruction and set address to the newly added slave device.

Further, in step 350, for the collided slave devices, the master device resets the predetermined period, and broadcasts the anti-collision instruction to all the slave devices. As previously described, since the anti-collision function of the correctly-responded slave devices is already disabled, only the slave device(s) whose anti-collision function is/are still enabled will respond to the anti-collision instruction.

In the second embodiment, the predetermined period after the second round may be set according to the number of collisions. The predetermined period at a next round is set to (0~(k)*3*TS), where TS is the time step and k is the number of collisions at a previous round. In an alternative embodiment, considering actual conditions, the predetermined period is set to (0~(m)*3)*TS, wherein m is the number of the collided slave devices in the previous round. Since the number of the collided slave devices is unknown, it is first assumed that the number of collisions is 3.

Figure 4C:
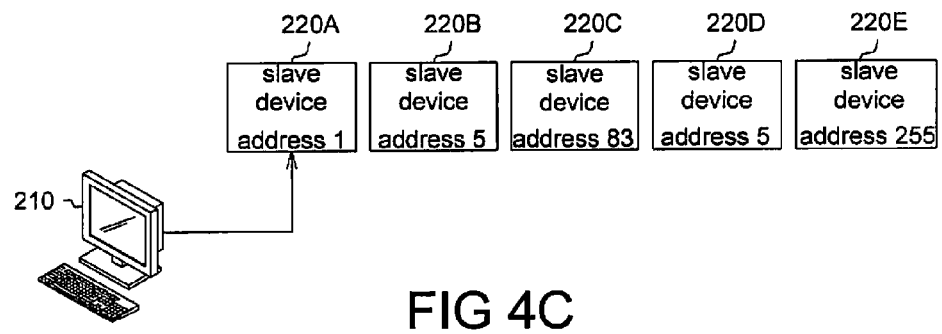
Figure 4D:
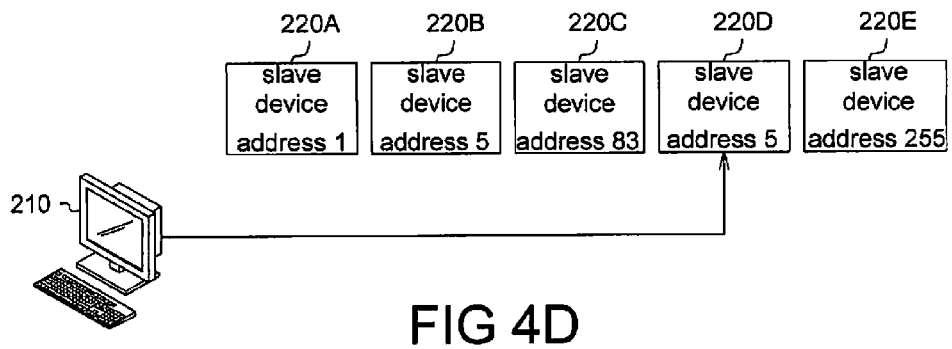
Figure 4E:
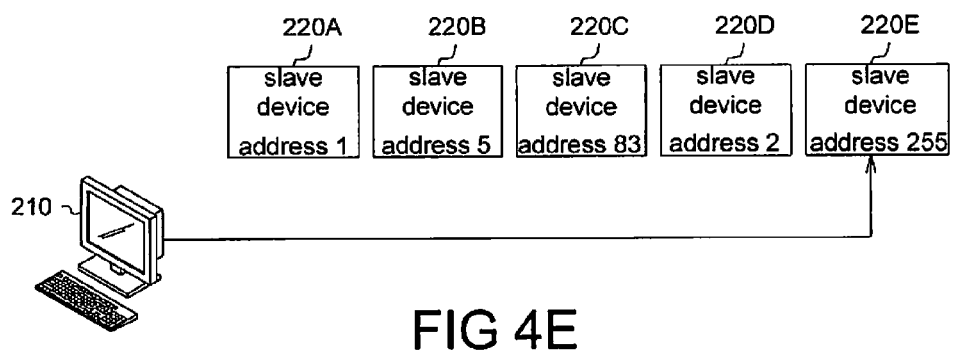
Figure 4F:
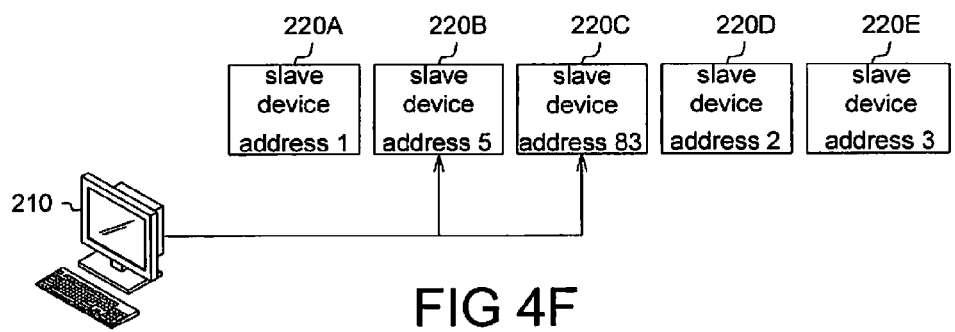
Figure 4G:
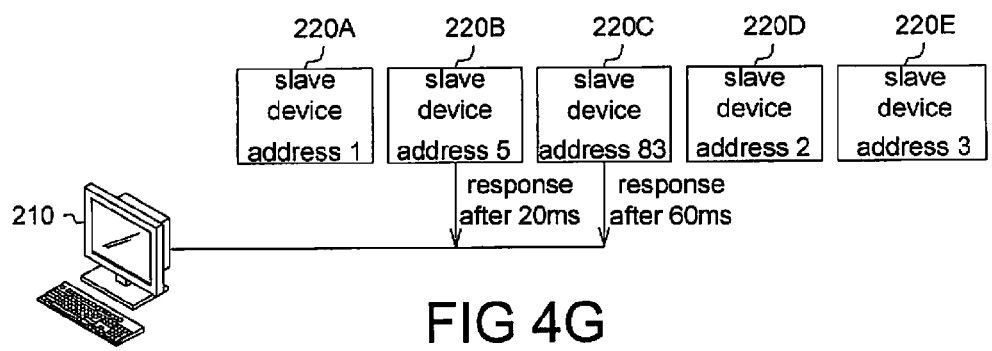
Figure 4H:
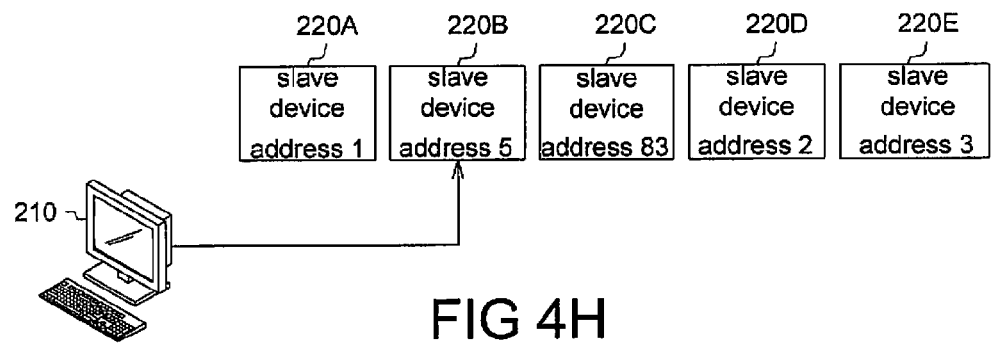
Figure 4I:
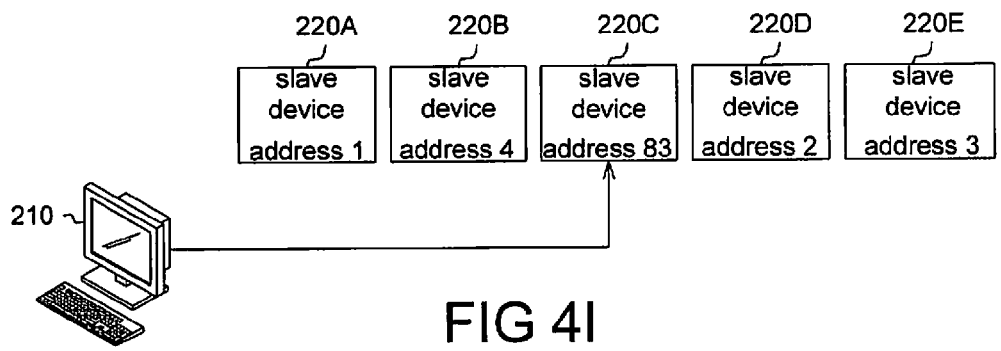
Figure 4J:
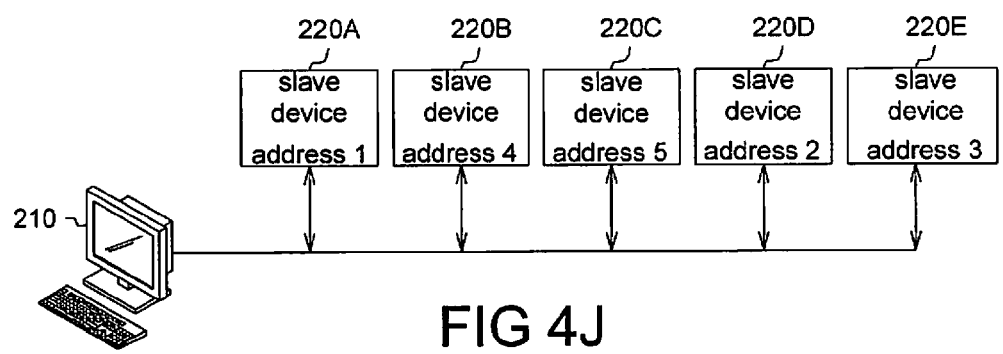

For example, in FIG. 4F, the predetermined period reset by the master device is [0~(number of collisions*3)]20 ms. As shown in FIG. 4G, the collided slave devices 220B and 220C respond at 20 ms and 60 ms, respectively, after they receive the broadcast anti-collision instruction. Therefore, the master device 210 identifies the slave devices 220B and 220C. The master device 210 then stores the unique identification data of the slave devices 220B and 220C, and sets the addresses of the slave devices 220B and 220C. As shown in FIGS. 4H to 4J, the master device 210 sets the addresses of the slave devices 220B and 220C to the address 4 and the address 5.

In step 360, the master device determines whether the addresses of all the slave devices have been set. If not, the process continues to step 320 until the addresses of the all the slave devices have been correctly set.

In the embodiment, the initial predetermined period (i.e. the predetermined period for the first round) set by the master device is associated with the number of the slave devices. To further shorten the search time, the subsequent predetermined period (as shown in FIG. 4F) for the subsequent round, which is set by the master device, may be shorter than the initial predetermined period set by the master device (as shown in FIG. 4A). The reason for the above is that, in FIG. 4A, to allow the response time points of all the slave devices to be non-colliding with one another, a longer initial predetermined period is required. In the subsequent process, as only the communication-collided slave devices need to return data, the subsequent predetermined period may be shorter compared to the initial predetermined period.

When setting addresses, the master device may start setting from the address 1 and record addresses already used. In another embodiment, the master device may also start setting from the largest address and record the used addresses. Alternatively, the master device may start setting from other addresses and record used addresses.

Further, the master device may send out the anti-collision instruction at a communication idle period to real-time monitor whether a new slave device is added into the communication device.

It is also known from the above descriptions that, in the embodiment, a situation of multiple slave devices having the same address in the communication network can be quickly eliminated. That is, the embodiment is capable of more quickly eliminating communication collisions.

In the above method for setting addresses of slave devices in a communication network, the communication network includes a master device and multiple slave devices. The master device is capable of communicating with each of the slave devices according to an address stored in each of the slave devices.

The above method includes: a) setting a predetermined period and an unused address group, wherein the unused address group includes an address that is not stored in any of the slave devices.

The above method further includes: b) sending out a broadcast detection instruction to request each of the slave devices to return its unique identification data to the master device within the predetermined period. For example, the broadcast detection instruction is the anti-collision instruction sent out by the master device 210 in FIG. 4A.

The above method further includes: c) the master device obtaining a signal collision number and a first unique identification data group according to the response of each of the slave devices within the predetermined period. The unique identification data group may include respective unique identification data returned from the slave devices that are correctly identified by the master device. Taking FIG. 4B for example, the signal collision number is 1, and the first unique identification data group includes the unique identification data respectively returned by the slave devices 220A, 220D and 220E.

The above method further includes: d) selecting first unique identification data from the first unique identification data group, and designating a first unused address from the unused address group as a new address of a first slave device among the slave devices according to the first unique identification data and the first slave device. Taking FIG. 4C for example, the master device 210 designates the new address of the slave device 220A as the address 1, renders the first slave device not to respond to the broadcast detection instruction (the master device 210 disables the anti-collision function of the slave device 220A), and removes the first identification data from the first identification data group (the master device 210 removes the first identification data of the slave device 220A from the unique identification data group).

The above method further includes: e) repeating step (d) until the first identification data group excludes the unique identification data. For example, as shown in FIGS. 4c to 4E, after the new addresses of the slave devices 220A, 220D and 22E are correctly set, the unique identification data of the slave devices 220A, 220D and 220E is removed from the first identification data group.

The above method further includes: f) resetting the predetermined period according to the signal collision number. For example, as shown in FIG. 4F, the master device resets the predetermined period.

The above method further includes: g) repeating steps (b), (c), (d) and (e) until none of the slave devices responds to the broadcast detection instruction sent by the master device after the predetermined period ends. That is, until all the addresses of the slave devices have been correctly set and the anti-collision function of the slave devices are disabled, these slave devices with correctly set addresses no longer respond to the broadcast detection instruction.

In the two embodiments above, the master device and the slave devices may communicate through an RS-485 communication interface, for example. Further, for example, the master device may be a personal computer, and the slave devices may be machines containing a model number and a serial number, such as inverters, solar panels, electricity meters or meters.

While the application has been described by way of example and in terms of the preferred embodiments, it is to be understood that the application is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for setting addresses of slave devices in a communication network, the communication network comprising a master device and a plurality of slave devices, the master device communicating with each of the slave devices according to an address of each of the slave device, the setting method comprising:
   a) in response to a request from the master device, each of the slave devices responding to the master device according to its address;
   b) identifying a collision address group and an unused address group, the collision address group including a same address stored in at least two of the slave devices, and the unused address group including a plurality of addresses that are not stored in any of the slave addresses;
   c) selecting a first address from the collision address group;
   d) randomly returning a first unique identification data from the first slave device storing the first address to the master device within a predetermined period;
   e) the master device communicating with the first slave device to set a first unused address from the unused address group to the first slave device according to the first unique identification data; and
   f) repeating the steps (d) and (e) until the collision address group excludes the first address.

2. The setting method according to claim 1, further comprising:
   repeating the steps (d), (e) and (f) until the collision address group does not comprise any address.

3. The setting method according to claim 1, wherein a range of the addresses of the slave devices are natural numbers of 1 to N, and the slave devices respond to the master device according to an order of the addresses.

4. The setting method according to claim 1, wherein the step (e) further comprises:
   e-1) removing the first unused address from the unused address group.

5. The setting method according to claim 1, wherein the step (f) further comprises:
   f-1) rendering the first address to be stored only by the first slave device.

6. The setting method according to claim 1, wherein the step (f) further comprises:
   f-2) rendering the first address to be not stored by any of the slave devices.

7. The setting method according to claim 1, wherein the step (a) further comprises:
   the master device requesting for the unique identification data of the slave devices, and recording the addresses of the slave devices that correctly responded.

8. The setting method according to claim 1, wherein the unique identification data is a combination of a model number and a serial number, or a combination of the serial number and a cyclic redundancy check (CRC) checksum.

9. A method for setting addresses of slave devices in a communication network, the communication network comprising a master device and a plurality of slave devices, the master device communicating with each of the slave devices according to an address stored in each of the slave devices, the setting method comprising:
   a) setting a predetermined period and an unused address group, the unused address group including an address not stored in any of the slave devices;
   b) sending out a broadcast detection instruction to request each of the slave devices to return its unique identification data to the master device within the predetermined period;
   c) the master device obtaining a signal collision number and a first unique identification data group according to a response of each of the slave devices within the predetermined period, the first unique identification data group including unique identification data respectively returned from the slave devices that are correctly identified by the master device;
   d) selecting a first unique identification data from the first unique identification data group, communicating with a first slave device among the slave devices to set a first unused address from the unused address group as a new address of the first slave device according to the first unique identification data, disabling the first device for not responding to the broadcast detection instruction, and removing the first unique identification data from the first unique identification data group;
   e) repeating the step (d) until the first identification data group does not comprises any unique identification data;
   f) resetting the predetermined period according to the signal collision number; and
   g) repeating the steps (b), (c), (d) and (e) until none of the slave devices responds to the broadcast detection instruction sent out by the master device after the predetermined period ends.

10. The setting method according to claim 9, wherein in the step (a), the master device determines the predetermined period according to a number of the slave devices.

11. The setting method according to claim 9, further comprising:
    h) the master device periodically or non-periodically performs the step (b) to confirm whether a new slave device is added to the communication network.

12. The setting method according to claim 9, wherein the step (b) further comprises:
    the master device enabling an anti-collision function of the slave devices to prompt the slave devices to respond to the broadcast detection instruction.

13. The setting method according to claim 9, wherein:
    in the step (c), the number of signal collision is associated with whether the slave devices respond at the same time; and
    if two or more of the slave devices return their unique identification data at the same time, the master device does not identify the unique identification data returned at the same time and determines that a communication collision occurs.

14. The setting method according to claim 13, wherein if a response time point of the first slave device is non-colliding with a response time point of one other slave device, the first unique identification data returned by the first slave device is correctly identified by the master device.

15. The setting method according to claim 9, wherein the unique identification data is a combination of a model number and a serial number, or a combination of the serial number and a checksum.

\* \* \* \* \*